May 6, 1969 K. W. G. SOWA 3,443,185

CIRCUITRY AND METHOD OF STRIKING THYRISTORS IN INVERSE-PARALLEL OPERATION

Filed Aug. 2, 1966

3,443,185
Patented May 6, 1969

1

3,443,185

CIRCUITRY AND METHOD OF STRIKING THYRISTORS IN INVERSE-PARALLEL OPERATION

Kurt Wilhelm Gunter Sowa, Frankfurt am Main, Germany, assignor to Richard Heim, Efferen, Kreis Cologne, Germany Filed Aug. 2, 1966, Ser. No. 569,612
Claims priority, application Germany, Aug. 3, 1965, H 56,746
Int. Cl. H02p 7/62
U.S. Cl. 318—227 5 Claims

ABSTRACT OF THE DISCLOSURE

Method and apparatus for triggering a pair of thyristors in inverse parallel comprising circuitry including a resistor in parallel with a Zener diode for sensing the triggering of the first thyristor and a delay circuit for triggering the second thyristor a predetermined time after the triggering of the first thyristor.

The invention relates to the triggering of controlled rectifiers connected in inverse-parallel relation without using a transformer.

It often becomes necessary to switch or control an A.C. load in contactless manner. Inverse-parallel connected controlled rectifiers are suitable for this purpose.

Controlled rectifiers, such as thyratrons, are being increasingly replaced by controlled silicon cells (thyristors) which—in contrast to thyratrons—need no filament power and thus no filament transformer.

It is a known fact that controlled rectifiers are triggered by feeding the triggering or gate electrode with an appropriate current. This current is needed only for triggering and can be turned off thereafter. It is possible to trigger controlled rectifiers with D.C., A.C. or pulses.

A thyristor of which the cathode is connected to ground or zero potential can easily be triggered by suitable transistor circuitry; however, thyristors of which the anode is connected to ground or zero potential require special arrangements for triggering.

In the case of an inverse-parallel connection of two thyristors, the first thyristor with cathode connected to ground or zero potential can be triggered by a pulse which relates to zero potential. The second thyristor, however, has to be triggered by a source independent of zero ground potential. The conventional form of a triggering source is a transformer with at least two insulated coils.

This source can be considerably simplified and the transformer eliminated, if—according to the invention—the second thyristor is triggered by a voltage which is generated by the current of the first thyristor which in turn generates a voltage drop across a resistor connected in series with the load.

This voltage drop, integrated into the appropriate phase relation, serves to trigger the second thyristor. It is necessary that the second thyristor (anode connected to zero) is not triggered before the first thyristor has been triggered. Care must be taken that this voltage drop continues until the second thyristor has been triggered.

Figures 1, 2, 3:
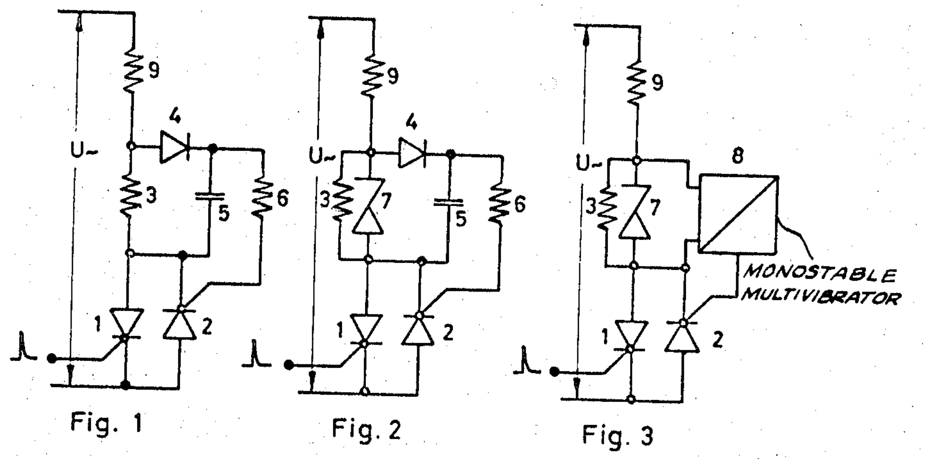

FIG. 1 shows that thyristor 1 can be triggered in the presence of the positive half wave and that the voltage drops at resistor 3 which is connected in series with load 9.

Capacitor 5 is charged via diode 4. The time constant given by capacitor 5, resistor 6, and the input impedance of thyristor 2, must be sufficiently long to provide the triggered current for thyristor 2 in the presence of the negative half wave. On the other hand, the time constant must be sufficiently short to prevent the triggering current from persisting over one whole period. A value of $T=5$ ms. at 50 Hz. proved to be favorable.

2

If this arrangement is connected to a load whose current varies during operation, the voltage drop on resistor 3 will vary as well. To avoid this, a Zener diode 7 is connected in parallel to the resistor, see FIG. 2. The Zener voltage is used for charging capacitor 5. The Zener voltage must exceed the triggering voltage of thyristor 2 and the forward voltage of diode 4. Tests using Zener diodes enabled currents of up to 1.4 a. to be switched reliably.

If it becomes necessary to control thyristor 1 and thyristor 2 in-phase, the above arrangement has to be extended. FIG. 3 shows a delay circuit 8 (which may comprise a monostable multivibrator) which supplies the triggering pulse to thyristor 2 half a period after thyristor 1 has been triggered. Tests were conducted using for the delay, a monostable multivibrator with a fixed delay time of 10 ms. (50 Hz. line). If the described circuits are set up as modules, control devices for an A.C. load can be assembled in a simple way.

In the tests, the speeds of three-phase asynchronous motors were controlled by the two arrangements shown in FIG. 2 and FIG. 3, respectively. A speed control ratio of 1:12 was obtained.

Figure 4:
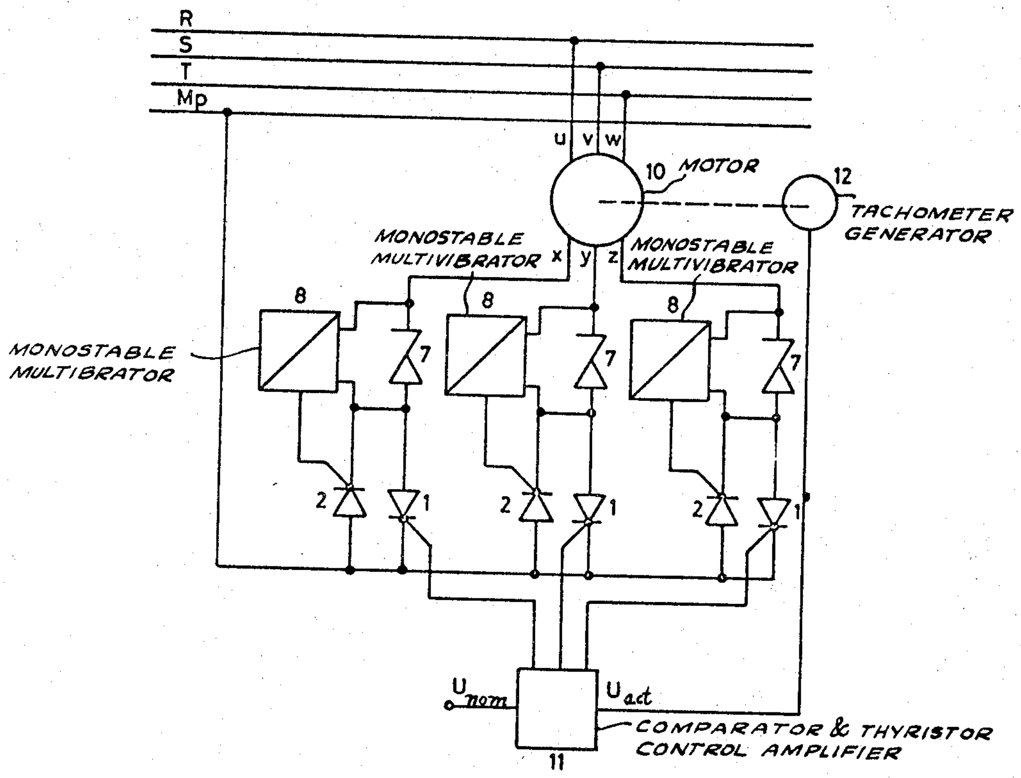

FIG. 4 shows an example of an assembly for the speed control of a three-phase asynchronous motor 10 without slip-rings.

A.C. lines R, S, T supply three phase input power using common ground line M*p*. Leads *u*, *v* and *w* extend to motor 10, and speed control is applied over leads *x*, *y* and *z*.

The control can be made in two of the three phases, possibly even in one phase. In the case of three-phase control, the current will be the same in the three coils. The thyristors 1 are controlled in-phase according to the output value of the comparator and thyristor control amplifier 11. A tachometer generator 12 coupled with the motor supplies an actual voltage ($U_{act}$) which is compared with a given control voltage ($U_{nom}$). Otherwise like numbers designate like parts, as described in connection with FIGS. 1–3.

While the preferred embodiment of the invention is described in connection with FIG. 3 and is shown applied to a three-phase motor in FIG. 4; it will be appreciated that the principles herein disclosed are susceptible of modification and accordingly it is intended that the invention be limited only by the scope of the appended claims.

I claim:

1. An A.C. switching circuit for supplying controlled voltage to a load, comprising in combination:

a first thyristor;

a second thyristor having a gate electrode;

means connecting said first and second thyristors in inverse parallel;

terminal means adapted to be connected to an A.C. source;

a network comprising a resistor and a Zener diode connected in parallel;

means connecting said first and second thyristors, said terminal means and said network in series with the load;

means for triggering said first thyristor; and delay means connected with said network and said gate electrode of said second thyristor for delayed triggering of said second thyristor in response to voltage across said network.

2. The circuit as recited in claim 1 wherein said delay means includes a resistor-capacitor network connected with said gate electrode of said second thyristor and a diode connected between said Zener diode-resistor network and said resistor-capacitor network.

3. The circuit as recited in claim 1 wherein said delay means includes a monostable multivibrator.

4. A speed control circuit for a three-phase asynchronous motor without a slip ring, comprising:

a plurality of switching circuits as recited in claim 1, each of said switching circuits being connected with the motor and being adapted to be connected with a three-phase source;

a control amplifier connected with the first thyristor in each of said switching circuits; and a tachometer-generator coupled with the motor and said control amplifier to supply a signal corresponding to the speed of the motor to said control amplifier for comparison with a reference signal to control the speed of the motor.

5. A method of triggering first and second thyristors connected in inverse parallel, comprising the steps of:

triggering the first thyristor by pulsing the gate electrode thereof;

sensing the current passed by said first thyristor and providing a signal corresponding thereto;

limiting the signal corresponding to the sensed current;

delaying the signal corresponding to the sensed current; and supplying the delayed signal corresponding to the sensed current to the gate electrode of the second thyristor to trigger the second thyristor a predetermined time after the triggering of the first thyristor.

References Cited

UNITED STATES PATENTS

| | | | |
|---|---|---|---|
| 3,290,514 | 12/1966 | Haskovec et al. | 307—252 |
| 3,293,449 | 12/1966 | Gutzwiller | 307—252 |
| 3,307,094 | 2/1967 | Ogle | 307—252 XR |
| 3,348,110 | 10/1967 | Koppelmann | 318—231 XR |

FOREIGN PATENTS

| | | |
|---|---|---|
| 970,553 | 9/1964 | Great Britain. |

ORIS L. RADER, *Primary Examiner.*

G. Z. RUBINSON, *Assistant Examiner.*

U.S. Cl. X.R.

307—252, 305; 315—205; 318—230; 323—24